(12) United States Patent
Chandrasekaran et al.

(10) Patent No.: US 10,817,521 B2
(45) Date of Patent: *Oct. 27, 2020

(54) NEAR-REAL-TIME PREDICTION, CLASSIFICATION, AND NOTIFICATION OF EVENTS IN NATURAL LANGUAGE SYSTEMS

(71) Applicant: International Business Machines Corporation, Armonk, NY (US)

(72) Inventors: Swaminathan Chandrasekaran, Coppell, TX (US); Bharath Dandala, Austin, TX (US); Lakshminarayanan Krishnamurthy, Round Rock, TX (US); Alvin C. Richardson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 854 days.

This patent is subject to a terminal disclaimer.

(21) Appl. No.: 15/052,121

(22) Filed: Feb. 24, 2016

(65) Prior Publication Data

US 2016/0170997 A1    Jun. 16, 2016

Related U.S. Application Data

(63) Continuation of application No. 14/534,258, filed on Nov. 6, 2014.

(51) Int. Cl.
*G06F 16/2457*    (2019.01)
*G06N 5/04*    (2006.01)
(Continued)

(52) U.S. Cl.
CPC ...... *G06F 16/24578* (2019.01); *G06F 16/243* (2019.01); *G06F 16/9032* (2019.01);
(Continued)

(58) Field of Classification Search
CPC .......... G06N 5/04; G06N 5/02; G06N 99/005; G06N 20/00; G09B 7/04; G06F 9/4446
(Continued)

(56) References Cited

U.S. PATENT DOCUMENTS 6,611,579 B1    8/2003 Drew et al.
7,702,598 B2    4/2010 Saidi et al.
(Continued)

OTHER PUBLICATIONS

Zhang et al.—"A Knowledge Management Framework for the Support of Decision Making in Humanitarian Assistance/Disaster Relief"—2002—https://link.springer.com/article/10.1007/s101150200012 (Year: 2002).*

Furbach et al.—"An Application of Automated Reasoning in Natural Language Question Answering"—2010—https://www.semanticscholar.org/paper/An-application-of-automated-reasoning-in-natural-Furbach-GI%C3%B6ckner/5d8ca70a0448998162f91e3ce84fac92e10d4ccf (Year: 2010).*

(Continued)

*Primary Examiner* — Ann J Lo
*Assistant Examiner* — Viker A Lamardo
(74) *Attorney, Agent, or Firm* — Terrile, Cannatti & Chambers, LLP; Michael Rocco Cannatti

(57) ABSTRACT

An approach is provided for automatically predicting an event occurrence based on a question from an end user presented using a near-real-time natural language processing (NLP) analysis to generate, score and rank a plurality of event occurrences based on a plurality of question context parameters extracted from the question, one or more user profile parameters for the end user, and the one or more historical questions, answers, and events having a specified spatial and/or temporal proximity to the question which are identified by an information handling system. In the approach, performed by an information handling system, a top ranked event occurrence from the ranked plurality of event occurrences is selected for inclusion in a notification message that is communicated or broadcast to the end user, as well as other users engaged with the information handling system and/or first responders in the affected area.

11 Claims, 4 Drawing Sheets

(51) Int. Cl.
  *G06F 16/242* (2019.01)
  *G06N 5/02* (2006.01)
  *G06F 16/9032* (2019.01)
(52) U.S. Cl.
  CPC ............... *G06N 5/022* (2013.01); *G06N 5/04* (2013.01); *G06N 5/048* (2013.01)
(58) Field of Classification Search
  USPC .......................................................... 706/11
  See application file for complete search history.

(56) References Cited

U.S. PATENT DOCUMENTS

| | | | |
|---|---|---|---|
| 8,005,767 B1 | 8/2011 | Cassella | |
| 8,593,274 B2 | 11/2013 | Gancarcik et al. | |
| 2004/0210661 A1 | 10/2004 | Thompson | |
| 2012/0047135 A1 | 2/2012 | Hansson et al. | |
| 2014/0006012 A1* | 1/2014 | Zhou et al. | G06F 16/345 707/748 |
| 2014/0114981 A1* | 4/2014 | Lindberg | G06F 16/345 707/748 |
| 2014/0280294 A1* | 9/2014 | Stekkelpak | G06F 17/30867 707/769 |
| 2015/0088998 A1* | 3/2015 | Isensee | H04L 51/02 709/206 |
| 2015/0254785 A1* | 9/2015 | Yang | G06N 7/005 705/26.41 |
| 2015/0278695 A1* | 10/2015 | Shah | G06N 5/00 706/11 |

OTHER PUBLICATIONS

Hayes et al., "A Case-Based Reasoning View of Automated Collaborative Filtering," LNAI 2080, 2001, pp. 234-248.
Zhang et al., "A Knowledge Management Framework for the Support of Decision Making in Humanitarian Assistance/Disaster Relief," KIS, 2002, pp. 370-385.
Jia et al., "Question Answering System in Network Education Based on FAQ," ICUCS, 2008, pp. 2577-2581.
Furbach et al., "An Application of Automated Reasoning in Natural Language Question Answering" AI Communications, 2010, pp. 1-27.
List of IBM Patents or Applications Treated as Related.
D. Istrate et al., Embedded Implementation of Distress Situation Identification Through Sound Analysis, The Journal on Information Technology in Healthcare 6, 204-211, (2008).
R. High, "The Era of Cognitive Systems: An Inside Look at IBM Watson and How it Works," IBM Redbooks, 2012, pp. 1-15.
Yuan et al., "Watson and Healthcare," IBM developerWorks, 2011, pp. 1-9.
IBM, Journal of Research and Development, This is Watson, Introduction and Table of Contents, vol. 56, No. 3/4, May/Jul. 2012, http://ieeexplore.ieee.org/xpl/tocresult.jsp?reload=true&isnumber=6177717, pp. 1-5.
Coyle et al., Improving Recommendation Ranking by Learning Personal Feature Weights, ECCCBR, 2004, 13 pages.
A.K. Marsden, Getting the Right Ambulance to the Right Patient at the Right Time, AEN, 1995, pp. 173-183.

* cited by examiner

NEAR-REAL-TIME PREDICTION, CLASSIFICATION, AND NOTIFICATION OF EVENTS IN NATURAL LANGUAGE SYSTEMS

BACKGROUND OF THE INVENTION

In the field of artificially intelligent computer systems capable of answering questions posed in natural language, cognitive question answering (QA) systems (such as the IBM Watson™ artificially intelligent computer system or and other natural language question answering systems) process questions posed in natural language to determine answers and associated confidence scores based on knowledge acquired by the QA system. In operation, users submit one or more questions through a front-end application user interface (UI) or application programming interface (API) to the QA system where the questions are processed to generate answers that are returned to the user(s). When a large number of users are simultaneously submitting questions, such as during distress situations, the submitted questions typically do not include explicit information identifying each user, resulting in the submitted questions being treated independently from one another by the QA system which generates separate procedural responses from the ingested corpus. As a result, traditional QA systems will sequentially process submitted questions in chronological order without regard to user identity information or any contextual understanding of other, potentially relevant questions and/or answers. As a result, the existing solutions for efficiently providing contextualized processing of questions and answers are extremely difficult at a practical level.

SUMMARY

Broadly speaking, selected embodiments of the present disclosure provide a system, method, and apparatus for processing of inquiries to an information handling system capable of answering questions by using the cognitive power of the information handling system to provide real time prediction, classification, and notification of critical or distress events based on extracted data relating to user profile and interest in combination with relevant questions from other users in the same or similar spatial and/or temporal vicinity. In selected embodiments, the information handling system may be embodied as a question answering (QA) system which receives and answers one or more questions from one or more users. To answer a question, the QA system has access to structured, semi-structured, and/or unstructured content contained or stored in one or more large knowledge databases (a.k.a., "corpus"). In addition to answering questions, the QA system processes inquiries in real time to identify distress events that are related to specific inquiries by extracting user profile, timing, and location information, and comparing the extracted information with event history information and related questions and/or answers from spatially and/or temporally proximate users to classify and predict distress events. To predict distress events, the information handling system may be embodied as a question answering (QA) system which receives a set of questions from one or more users. With each question, the QA system performs NLP analysis of the question to derive an answer. In addition, the QA system applies semantic analysis to extract end user profile, time, location, and sentiment information. In selected embodiments, automatic authorship profiling or other analysis tools are applied to extract the structure and semantics from the question text, such as emotion analysis, authorship profiling and message perception. By applying NLP processing and deep learning techniques to the extracted information and to historical information relating to other events, question and answers, and/or a distress event corpus, the QA system classifies, scores, and ranks candidate distress events to predict a distress event based on their relevance to the user's question in a near-real time basis, allowing a notification of the predicted distress event to be communicated back to the relevant user(s) and/or first responders.

The foregoing is a summary and thus contains, by necessity, simplifications, generalizations, and omissions of detail, consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
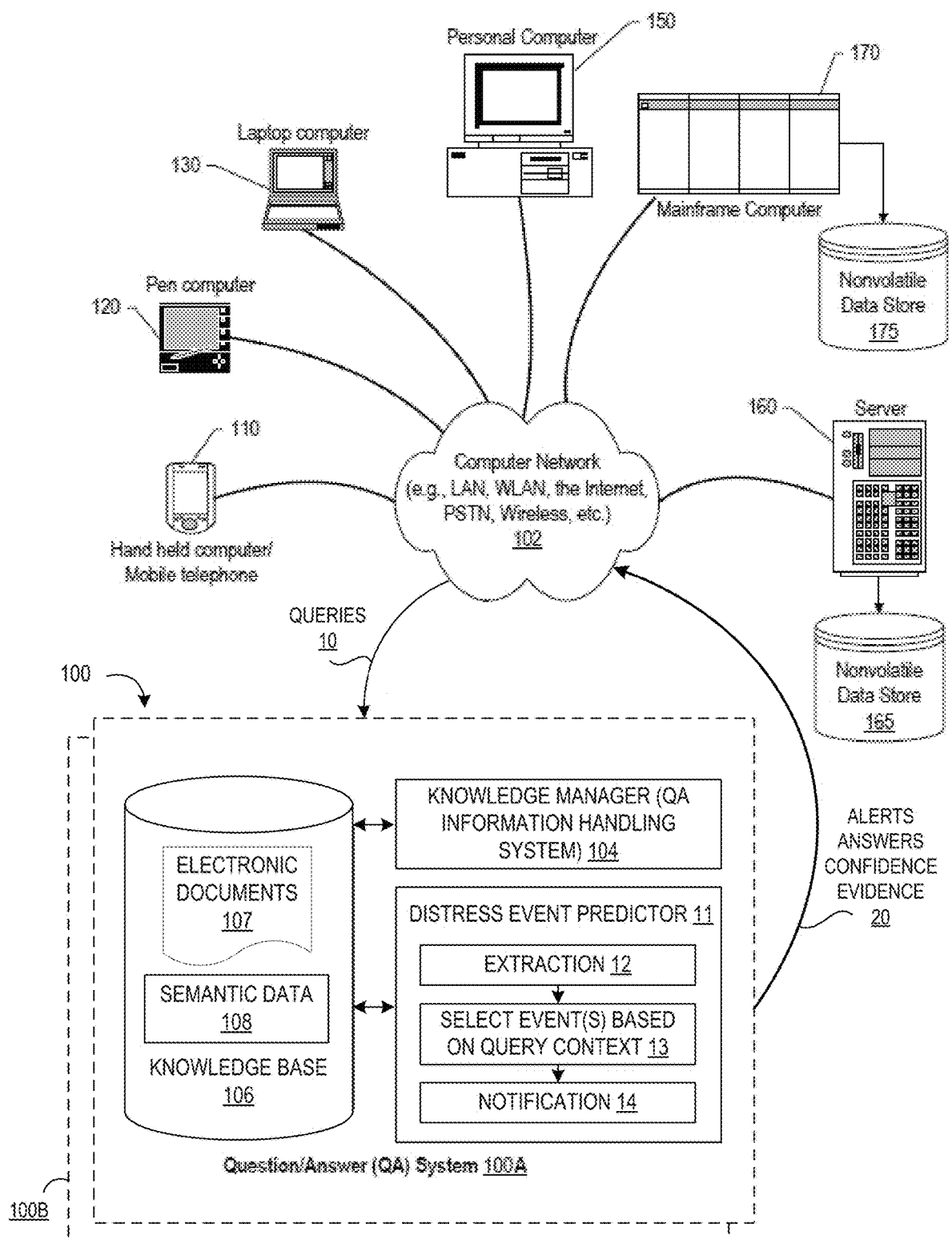
FIG. 1 depicts a network environment that includes a knowledge manager that utilizes a knowledge base.

The present invention may be a system, a method, and/or a computer program product. In addition, selected aspects of the present invention may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present invention may take the form of computer program product embodied in a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a question/answer (QA) system 100 connected to a computer network 102. The QA system 100 may include one or more QA system pipelines 100A, 100B, each of which includes a computing device 104 (comprising one or more processors and one or more memories, and potentially any other computing device elements generally known in the art including buses, storage devices, communication interfaces, and the like) for processing questions received over the network 102 from one or more users at computing devices (e.g., 110, 120, 130). Over the network 102, the computing devices communicate with each other and with other devices or components via one or more wired and/or wireless data communication links, where each communication link may comprise one or more of wires, routers, switches, transmitters, receivers, or the like. In this networked arrangement, the QA system 100 and network 102 may enable question/answer (QA) generation functionality for one or more content users. Other embodiments of QA system 100 may be used with components, systems, subsystems, and/or devices other than those that are depicted herein.

In the QA system 100, the knowledge manager 104 may be configured to receive inputs from various sources. For example, knowledge manager 104 may receive input from the network 102, one or more knowledge bases or corpora of electronic documents 106 or other data, a content creator 108, content users, and other possible sources of input. In selected embodiments, the knowledge base 106 may include structured, semi-structured, and/or unstructured content in a plurality of documents that are contained in one or more large knowledge databases or corpora. The various computing devices (e.g., 110, 120, 130) on the network 102 may include access points for content creators and content users. Some of the computing devices may include devices for a database storing the corpus of data as the body of information used by the knowledge manager 104 to generate answers to cases. The network 102 may include local network connections and remote connections in various embodiments, such that knowledge manager 104 may operate in environments of any size, including local and global, e.g., the Internet. Additionally, knowledge manager 104 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 107 for use as part of a corpus of data with knowledge manager 104. The document 107 may include any file, text, article, or source of data (e.g., scholarly articles, dictionary definitions, encyclopedia references, and the like) for use in knowledge manager 104. Content users may access knowledge manager 104 via a network connection or an Internet connection to the network 102, and may input questions to knowledge manager 104 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager 104. Knowledge manager 104 may interpret the question and provide a response to the content user containing one or more answers to the question. In some embodiments, knowledge manager 104 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data stored in the knowledge base 106. Based on the application of the queries to the corpus of data, a set of hypotheses, or candidate answers to the input question, are generated by looking across the corpus of data for portions of the corpus of data that have some potential for containing a valuable response to the input question.

In particular, a received question 10 may be processed by the IBM Watson™ QA system 100 which performs deep analysis on the language of the input question 10 and the language used in each of the portions of the corpus of data found during the application of the queries, including the cluster relationship information 109, using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e., candidate answer, is inferred by the question. This process may be repeated for each of the candidate answers until the IBM Watson™ QA system identifies candidate answers that surface as being significantly stronger than others and thus, generates a final answer, or ranked set of answers, for the input question. The QA system 100 then generates an output response or answer 20 with the final answer and associated confidence and supporting evidence. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

In addition to providing answers to questions, QA system 100 includes a distress event predictor 11 which processes questions in real time to identify distress events that are related to specific questions. To provide meaningful predictions, the knowledge manager 104 may be configured extract user profile, timing, and location information relating to each submitted question. To this end, the knowledge manager 104 may use an extraction process 12, such as a semantic analysis tool or automatic authorship profiling tool, to extract the structure and semantics from the question text, such as user profile, timing, location, emotional content, authorship profile, and/or message perception. The extraction process 12 may use natural language (NL) processing to analyze textual information in the question and retrieved information from the database 106 in order to extract or deduce question context information related thereto, such as end user location information, end user profile information, time of day, lexical answer type (LAT) information, focus, sentiment, synonyms, and/or other specified terms. For example, the extraction process 12 may use a Natural Language Processing (NLP) routine to identify specified entity information in the corpora, where "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. The results of the extraction process 12 may be processed by the knowledge manager 104 with a selection process 13 which selects an event based on query context information. To this end, the selection process 13 may use an NLP process which compares the extracted information with event history information and related historical information concerning other questions and/or answers from spatially and/or temporally proximate users to classify and predict distress events. By applying NLP processing and deep learning techniques to the extracted information and to historical information relating to other events, question and answers, and/or a distress event corpus, the selection process 13 classifies, scores, and ranks candidate distress events to select a predicted distress event based on their relevance to the user's question in a near-real time basis. The identified or predicted events may be further processed by the knowledge manager 104 at the notification process 14 to notify relevant users of the predicted event and/or to broadcast the predicted event information to first responders.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems may use separate nonvolatile data stores (e.g., server 160 utilizes nonvolatile data store 165, and mainframe computer 170 utilizes nonvolatile data store 175). The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
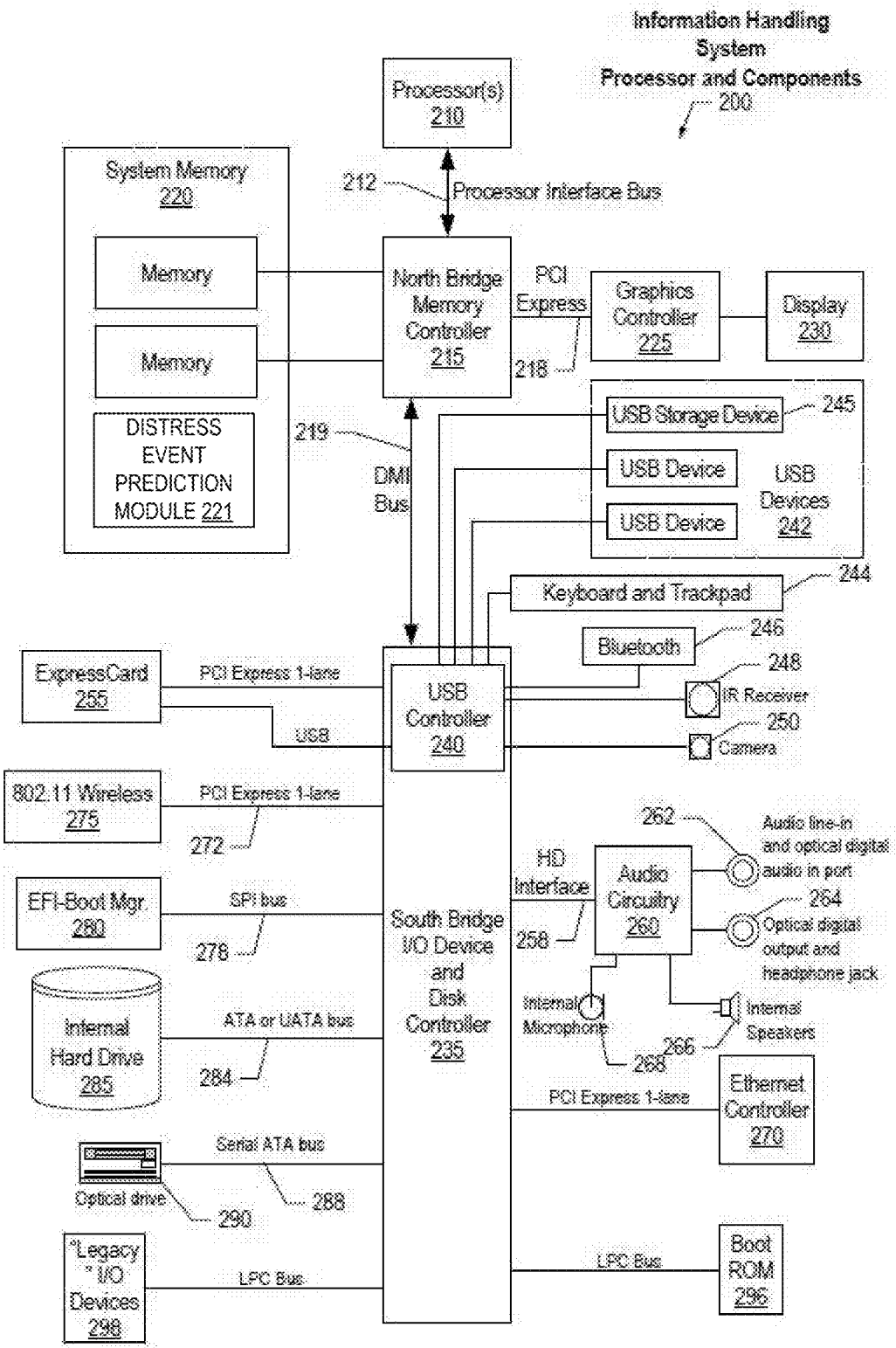
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. In the system memory 220, a variety of programs may be stored in one or more memory device, including a distress event prediction module 221 which may be invoked to provide near-real time classification, prediction, and notification of distress events. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etc.

Wireless Local Area Network (LAN) device 275 connects to Southbridge 235 via the PCI or PCI Express bus 272. LAN device 275 typically implements one of the IEEE 802.11 standards for over-the-air modulation techniques to wireless communicate between information handling system 200 and another computer system or device. Extensible Firmware Interface (EFI) manager 280 connects to Southbridge 235 via Serial Peripheral Interface (SPI) bus 278 and is used to interface between an operating system and platform firmware. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory. In addition, an information handling system need not necessarily embody the north bridge/south bridge controller architecture, as it will be appreciated that other architectures may also be employed.

Figure 3:
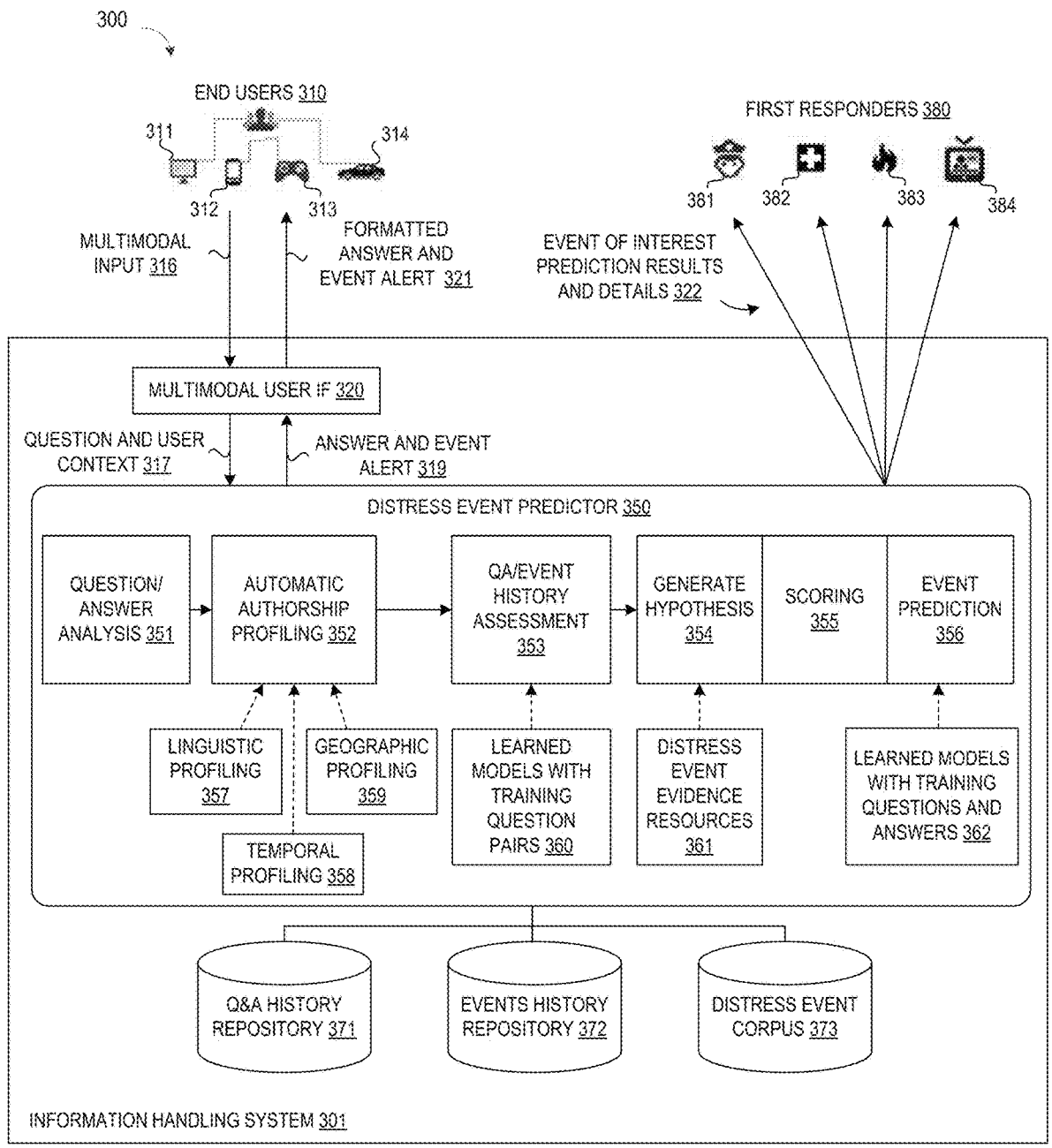
FIG. 3 is a component diagram depicting various system components for predicting distress events based on extracted user profile data and historical event and question/answer data.
Figure 4:
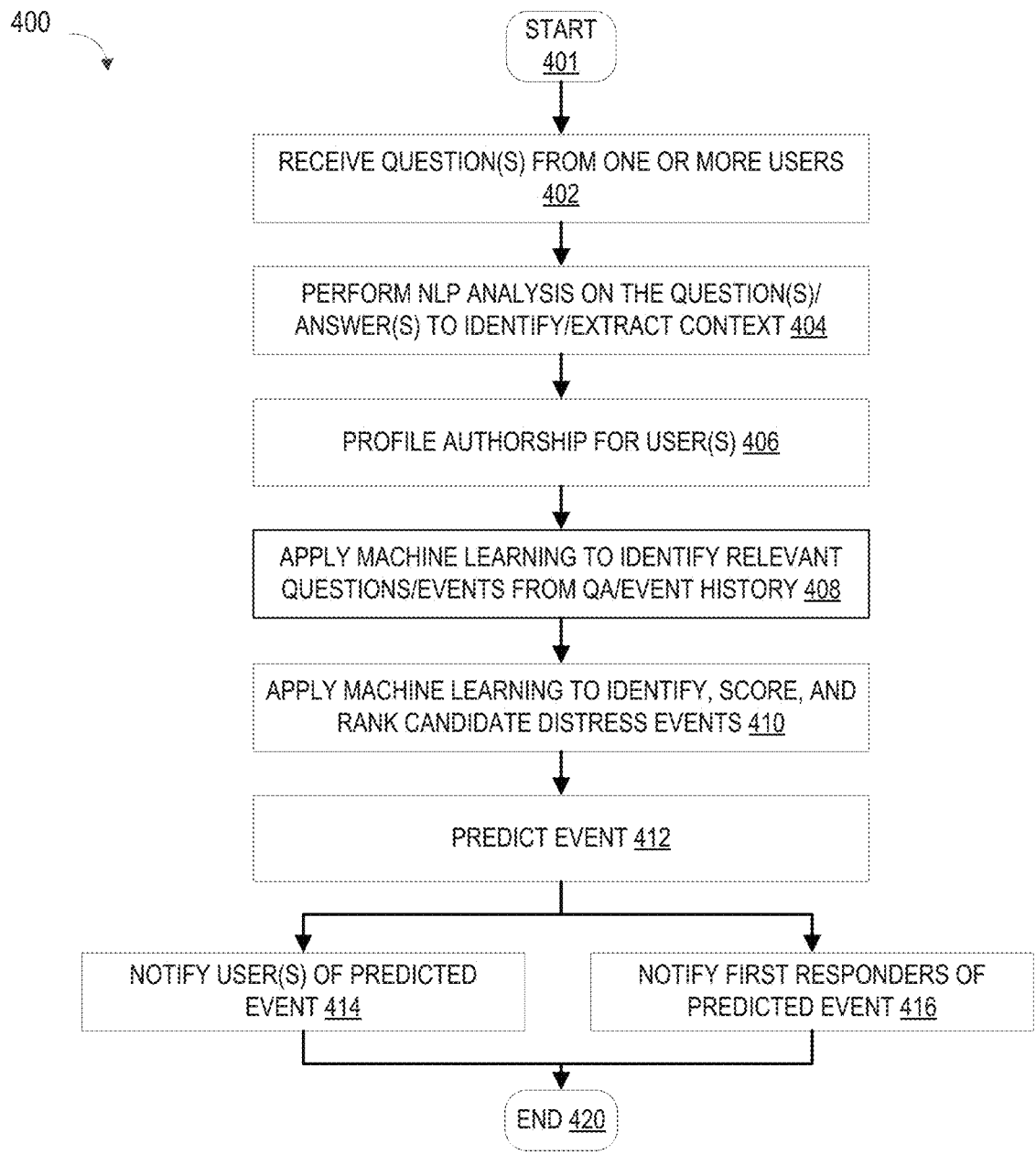
FIG. 4 illustrates a simplified flow chart showing the logic for generating distress event predictions using extracted user profile data and historical event and question/answer data to score, rank, and select a predicted distress event.

FIGS. 3-4 depict an approach that can be executed on an information handling system to predict distress events based on contextual information extracted from questions 10 being presented to a knowledge management system, such as QA system 100 shown in FIG. 1, along with contextual historical information relating to other events, question and/or answers stored in the corpus 106. This approach can be included within the QA system 100 or provided as a separate entity relationship identification system, method, or module. Wherever implemented, the disclosed distress event prediction scheme mines submitted questions from one or more end users who may not be aware of a brewing situation, as well as unstructured and semi-structured documents and text from a plurality of knowledge bases or corpora, for information about the user context and related questions, answers, and historical events to classify, predict, and broadcast events in response to a presented question. The mined information includes the presence of any key terms or phrases (e.g., smoke, suspicious bag, power outage, emergency, etc.) or named entities in the questions which may be extracted from different databases by using NLP techniques. In addition, the mined user information may include user profile information for the end user(s), location information for the end user(s), and date or time information associated with each submitted question. Using the mined information, the distress event prediction scheme applies a machine learning model to predict the occurrence of certain kind of events (e.g., power outage, fire, medical emergency) by applying natural language processing and deep learning techniques to related contextual historical information relating to other events, question and/or answers, thereby modelling a ranked list of candidate distress events to predict a distress event based on their relevance to the user's question in a near-real time basis, allowing a notification of the predicted distress event to be communicated back to the relevant user(s) and/or first responder agencies, such as ambulances, hospitals, police, city public works, etc. With the disclosed distress event prediction scheme, an information handling system can be trained to generate and rank several procedural responses from the ingested corpus based on the criticalness of the situation and user profile information.

To provide additional details for an improved understanding of selected embodiments of the present disclosure, reference is now made to FIG. 3 which depicts a component diagram 300 of various system components for predicting distress events based on contextualized question information such as extracted user profile data and historical event and question/answer data. The system components shown in FIG. 3 may be used to discover contextual information from a question request (e.g., question 10), answer (e.g., answer 20), and the knowledge corpora 106 in the cognitive system 100, such as an IBM Watson™ QA system or other natural language question answering system shown in FIG. 1.

In selected embodiments, the system component diagram 300 may be used to evaluate questions submitted to an information handling system 301 by a set of independent end users 310 which may include one or more computer devices 311, mobile devices 312, gaming devices 313, and/or automotive computer devices 314. With a variety of different end user devices 310-314, the questions 316 may be submitted in different input formats or signaling modes at the same time or in close temporal proximity to one another, and are represented as a multimodal input 316 which is presented to the information handling system 301. Examples of such input questions 316 from the end users 310 might include any type of natural language questions, such as "What is the number to reach the Air Ambulance?" or "I see a suspicious package on the street. What should I do?" or "What are the first steps to take after a snake bite?" or "I see a fallen tree. Where should I report?"

The information handling system 301 can respond to each received question 316 by providing a procedural response in the form of an answer 321 based on knowledge in the ingested corpus. However, to account for different formats or signaling modes for each submitted question 316, a multimodal user interface 320 may be provided for processing the multimodal input questions 316 to effectively transform the different inputs 316 to a shared or common format for processing at the information handling system 301. At this input stage, the multimodal user interface 320 may be suitably configured to understand or determine profile, location, and timing information for each of the end users 310-314 and their interests at the level of event the user is experiencing in a near real-time, thereby generating for each question user context information 317. In selected example embodiments, the multimodal user interface 320 may generate user context information 317 by leveraging location information of each end user, such as by detecting specific end user location information (e.g., GPS coordinates) based on the end user device capabilities, and/or by detecting approximation-based end user location information (e.g., origination IP address). In an example situation where an end user submits a question, "I just saw a dog running around with red eyes and trying to bite me. What should I do?", the multimodal user interface 320 would extract user context information relating to the location from where the end user submitted the question (which can be detected using the GPS on their mobile devices or approximation using IP address), date and time information for the question, and the type of device used to submit the question.

Upon receiving the question and user context information 317, the information handling system 301 includes a distress event predictor system 350 which is used to understand the set of end users 310-314 interacting with the information handling system 301, and to classify and predict distress events based on this end user understanding and also event history information and related questions and/or answers from spatially and/or temporally proximate users. In selected example embodiments, the distress event predictor system 350 predicts an event of possible interest or relevance to an end user by first performing an analysis of each received question and/or resulting answer. In selected example embodiments, the analysis may be discovered by using the question/answer analysis component 351 to leverage the output of question and/or answer analysis using natural language processing techniques to identify key question/answer attributes and terms that are included in the question request or resulting answer. The processing at the question/answer analysis component 351 may be performed at the distress event predictor 11, extraction process 12, QA system 100, or other NLP question answering system. As described herein, a Natural Language Processing (NLP) routine may be used to perform deep NLP analysis on the question request, where "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. For example, NLP can be used to derive meaning from one or more human-oriented questions and return a listing of one or more key terms included in each question request. In a first example situation where there are rabid animals on the loose in a neighborhood area, different end users in the area may submit questions such as "Do I need to go to the doctor for a dog bite?" or "How do I know if a dog has rabies?" In a second example situation where there has been a local disease outbreak, different end users in the area may submit questions asking about characteristic symptoms of a disease being monitored by the CDC in the outbreak region. Other example questions may include "What are the phone numbers for the fire department?" or "How can I call an ambulance?"

At the question/answer analysis component 351, key words or phrases are extracted from the question request and/or answer. In addition or in the alternative, the question/answer analysis component 351 may perform answering type to determine a lexical answer type (LAT) associated with an input query. In addition or in the alternative, the question/answer analysis component 351 may assess the question focus associated with an input query and/or responsive answer output. In addition or in the alternative, the question/answer analysis component 351 may perform sentiment analysis (also known as opinion mining) using natural language processing, text analysis and computational linguistics to identify and extract subjective information associated with an input query and/or responsive answer output. Using the knowledge base or corpus, the question/answer analysis component 351 may also identify synonyms for the extracted question or answer terms. In an example situation where an end user submits a question, "Do I need to go to the doctor for a dog bite?", the QA analysis component 351 would extract the terms "doctor" and "dog bite" as key entity or key word information. In addition, the QA analysis component 351 would detect that the lexical answer type (LAT) would be the guidelines or recommendations when a dog bite occurs. The QA analysis component 351 would identify that the sentiment (beyond polarity) expressed in the question is "panic." In another example situation where an end user asks, "How do I know if a dog has rabies?", the QA analysis component 351 would extract the terms "dog" and "rabies" as key entity information. In addition, the QA analysis component 351 would detect that the lexical answer type (LAT) would be the care when bitten by rabies infected dog. And based on detecting that the disease type is rabies, the QA analysis component 351 would identify that the sentiment of the question is "caution" and "critical."

The results of the question/answer analysis component 351 may be used by the authorship profiling component 352 which automatically identifies contextual information about the end user. The processing at the authorship profiling component 352 may be performed at the distress event predictor 11, extraction process module 12, QA system 100, or other NLP question answering system. In selected example embodiments, the knowledge manager 104 may use the authorship profiling component 352 to automatically identify an author profile for the end user, such as the end user's age, gender, language, education, country, agreeableness, conscience, personality type (e.g., extroverted, neurotic, introverted, openness), or the like to provide a profile information the each end user associated with each question. In general, the authorship profiling component 352 may identify contextual information about the end user based on one or more behavioral authentication techniques, such as linguistic profiling 357, temporal profiling 358, and/or geographic profiling 359. In an example situation where an end user submits a question, "a mad dawg bit me man, what do I?", the authorship profiling component 352 would be applied to confidently predict that user is a male in his early 20's without a college education and having an extrovert personality. In another example situation where an end user asks, "Oh my God! I just saw a dog biting that poor man. What should I do?", the authorship profiling component 352 would be applied to confidently predict that user is a college educated female having a caring and open personality.

To help identify or predict distress events that may be related to a specific question from an end user, the distress event predictor system 350 may include a QA/Event history assessment component 353 which processes the results of the question/answer analysis and authorship profile information to identify other questions and answers stored in a Q&A history repository or database 371 which were submitted by other end users who submitted questions in the same or similar spatial and/or temporal vicinity to the information handling system 301. In addition or in the alternative, the QA/Event history assessment component 353 may use the results of the question/answer analysis and authorship profile information to identify other distress events stored in an events history repository or database 372 from the same or similar spatial and/or temporal vicinity. The processing at the QA/Event history assessment component 353 may be performed at the distress event predictor 11, classification process module 13, QA system 100, or other NLP question answering system. In selected example embodiments, the knowledge manager 104 may use the QA/Event history assessment component 353 to identify similar questions (and answers) from other end users in the same or similar spatial and/or temporal vicinity by using a machine learning approach to perform a fuzzy search to identify similarly asked questions from the Q&A history database 371 in the same temporal vicinity, time scale that other end users might have posed. In addition or in the alternative, the knowledge manager 104 may use the QA/Event history assessment component 353 to identify similar distress events by performing a probabilistic or vector space model-based search of the distress event corpus database 373 for similar distress events in the same temporal vicinity and/or time scale that may have been raised.

With respect to the QA/Event history assessment component 353, selected embodiments employ a machine learning model 360 that is configured to use vetted relative training question pairs to process the results of the question/answer analysis and authorship profile information to identify relevant questions, answers, and/or events from the Q&A history database 371 and/or the events history database 372. As will be appreciated, any desired machine learning model may be used which is a mathematical model to identify and score or rank previously submitted questions, answers, and/ or events characterized by the same or similar spatial and/or temporal vicinity. The mathematical model may include weighting values for each type of feature being scored or ranked, and given a particular input of feature weighting values, the values are input to the model and the model produces the score to indicate the relevance of the previously submitted questions, answers, and/or events. The individual feature values are variables to the model equation (a function with different weights for each variable) and the application of the model a value is given to each of the variables to produce a number. The model can be constructed manually or automatically from a set of training instances or question pairs. In this way, the QA/Event history assessment component 353 identifies similar requests for help from other end users such as can arise during a real world problem or emergency which triggers multiple requests from end users who may not be aware of developing emergency.

The results of the QA/Event history assessment component 353 may be used by the hypothesis generation component 354 to generate a set of hypothesis or candidate events based on the contextual information, such as the extracted user identity information and a contextual understanding of other previously submitted and potentially relevant questions, answers and/or events. The processing at the hypothesis generation component 354 may be performed at the distress event predictor 11, classification process module 13, QA system 100, or other NLP question answering system. In selected example embodiments, the knowledge manager 104 may use the hypothesis generation component 354 to predict a class of candidate events by executing a machine learning classification model which uses distress event evidence resources 361 to process input results from the question/answer analysis, authorship profile information, and relevant questions, answers, and/or events to identify a set or class of hypothesis or candidate events (e.g., power outage, fire, medical emergency) that may be relevant to a submitted question. As will be appreciated, any desired machine learning classification model may be used which is a mathematical model to identify the class of hypothesis or candidate events. The mathematical model may be executed against inputs providing context information relating to the end user who submitting the question as well as other relevant questions, answers, and events in the same or similar spatial and/or temporal vicinity. In selected embodiments, the model inputs for the hypothesis generation component 354 may include end user location info, end user attributes, time of the day, extracted terms and/or concepts from question and/or answer, question sentiment, similar events in certain vicinity, as well as other contextual information. With reference to the dog bite example questions described hereinabove, the hypothesis generation component 354 would generate a set of hypothesis or candidate events, such as "Stray Animal on the Loose," "Possible Disease Breakout," "Lost Dog," and "Infectious Animal."

The set of hypothesis or candidate events may then be scored at the scoring component 355 to generate a score or weighted value for each candidate event and any associated evidence. The processing at the scoring component 355 may be performed at the distress event predictor 11, classification process module 13, QA system 100, or other NLP question answering system. In selected example embodiments, the knowledge manager 104 may use the scoring component 355 to score the set or class of hypothesis or candidate events. The scoring component 355 may employ weighting values for each candidate event being scored and for each associated item of evidence. Based on a particular input of event and evidence weighting values, the scoring component 355 produces score values to indicate the relevance of each candidate event and any associated evidence. With reference to the dog bite example questions described hereinabove, the scoring component 355 would score each candidate event based on the predicted user profile, including the sentiment expressed, similar events occurring in the temporal vicinity, distress events history, the other natural language questions from the Q&A history. As a result, the "Infectious Animal" event might get a high confidence based on the machine learning models scoring.

The scored candidate events and associated evidence may then be ranked based on a situational analysis at the event prediction component 356 which is configured to perform final confidence merger and ranking. The processing at the event prediction component 356 may be performed at the distress event predictor 11, classification process module 13, QA system 100, or other NLP question answering system. In selected example embodiments, the knowledge manager 104 may use the event prediction component 356 to predict a specific event that is relevant to a submitted question by executing a machine learning-based ranking algorithm to rank the scored candidate events, such that the highest-ranked event is selected as the predicted distress event. As will be appreciated, any desired machine learning ranking model may be used which is a mathematical model to sort or rank the candidate events based on the associated scores. In selected embodiments, the event prediction component 356 may employ a machine learning model 362 that is configured to use vetted training distress questions and answers to process scored candidate events and associated evidence to identify and select the predicted distress event. As will be appreciated, any desired machine learning model may be used which is a mathematical model to identify and select the predicted distress event, where the model can be constructed manually or automatically from a vetted set of training question and answer pairs. Taken together, the system components 354-356 apply natural language processing and deep learning techniques to model, score, and rank a list of possible events of interest that may be relevant to the submitted inquiry based on extracted user profile information and situational analysis of other, similar questions, answers, and events from a similar time and location.

As seen from the foregoing, the distress event predictor system 350 identifies a predicted distress event that is relevant to an end user's submitted question based on contextual information from the end user and similar requests and answers from other end users presented in a similar location or time frame. In the first example situation where multiple question are submitted about rabid animals in a neighborhood area, the event prediction component 356 may generate a predicted distress event message which is sent as an event alert 319 to notify the end user that "There have been several sightings of a rabid dog in your immediate neighborhood. If someone has been bitten, local health officials recommend immediate medical attention." Such a predicted distress event message may be sent back to each end user 311-314 who has submitted similar questions from a similar location and/or time frame. For example, the distress event predictor system 350 can send the predicted distress event message as an event alert with the generated answer to a submitted question 319 in near-real time to the multimodal user interface 320 which generates a correctly formatted answer and event alert 321 for the designated end user. In this way, event alerts may be broadcast or funneled back to end users having similar profile and experiencing similar distress situations in the near-real time to provide more personalized or accurate results. In addition or in the alternative, the predicted distress event message may be sent to provide event of interest prediction results and details 322 in near-real time to relevant first responders 380, such as police 381, ambulance or hospital personnel 382, fire rescue 383, and/or city public works or new media personnel 384. In other embodiments, the distress event predictor system 350 can be trained to generate several procedural responses from the ingested corpus based on the criticalness of the situation and user's profile.

To provide additional details for an improved understanding of selected embodiments of the present disclosure, reference is now made to FIG. 4 which depicts a simplified flow chart 400 showing the logic for generating distress event predictions using extracted user profile data and historical event and question/answer data to score, rank, and select a predicted distress event. The processing shown in FIG. 4 may be performed by a cognitive system, such as an IBM Watson™ QA system or other natural language question answering system shown in FIG. 1, which generates event alerts and answers in response to submitted questions by ingesting structured, semi-structured, and/or unstructured content contained in a plurality of knowledge databases. FIG. 4 processing commences at 401 whereupon, at step 402, the process receives questions or inquiries from one or more end users. The processing at step 402 may be performed at the QA system 100 by the distress event predictor 11 or other NLP question answering system.

At step 404, the received question(s) are processed to identify or extract a contextual understanding for the question(s) being submitted. The processing at step 404 may be performed at the QA system 100 by the extraction process 12 or other NLP question answering system. As described herein, a Natural Language Processing (NLP) routine may be used to perform context extraction processing on the received questions and/or on any computed answer, where "NLP" refers to the field of computer science, artificial intelligence, and linguistics concerned with the interactions between computers and human (natural) languages. In this context, NLP is related to the area of human-computer interaction and natural language understanding by computer systems that enable computer systems to derive meaning from human or natural language input. As a result of the processing step 404, contextual information for each submitted question is identified, such as key terms, focus, lexical answer type (LAT) information, sentiment, synonyms, and/or other specified terms.

At step 406, authorship profile information is obtained for each end user submitting a question to identify or extract a user context for each question. The processing at step 406 may be performed at the QA system 100 by the extraction process 12 or other NLP question answering system. As described herein, a semantic analysis tool or automatic authorship profiling tool may be applied to obtain user profile information for the end user submitting each question. As a result of the processing step 406, user context information for each submitted question is identified, such as user profile, timing, location, or other authorship profile indicators. By extracting profile information for each end user that is presently interacting with the cognitive system, the other end users can be used not only as an augmented information source for generating distress event predictions, but also as a potential recipient of event alerts for the predicted distress event.

At step 408, the extracted context and profile data is processed to identify relevant questions and/or events from a repository of historical questions, answers, and/or events. The processing at step 408 may be performed at the QA system 100 by the extraction process 12 or other NLP question answering system. As described herein, the identification process may use a machine-learning approach to perform a fuzzy search algorithm to identify similar questions and related answers from a Q&A/events history database which were submitted for similar distress events in a similar time scale and location. In addition or in the alternative, the identification process may use a probabilistic or vector space model-based search of a distress event corpus database to identify similar distress events from in a similar time scale and location.

At step 410, a set of candidate or hypothesis distress events are identified, scored, and ranked by applying a machine learning classification model. The processing at step 410 may be performed at the QA system 100 by the classification process 13 or other NLP question answering system which performs deep syntactic and semantic analysis on extracted context data, user profile information, and relevant questions, answers, and events from the data corpus. For example, the machine learning process may be executed against inputs providing context information relating to the end user location info, end user attributes, time of the day, extracted terms and/or concepts from question and/or answer, question sentiment, focus, LAT, other similar events in the related time or vicinity, as well as other contextual information, such as similar events, questions and answers from other end users presented in a similar location or time frame. As a result of the processing step 410, the candidate set of distress events are scored, sorted and ranked in order.

At step 412, a distress event is selected as the predicted distress event. The processing at step 412 may be performed at the QA system 100 by the classification process 13 or other NLP question answering system. As described herein, the predicted distress event may be identified by selecting the candidate distress event having the highest rank or score.

At step 414, a notification of the predicted distress event is sent to the user who submitted the question, along with any other users in the same or similar spatial and/or temporal vicinity. In addition or in the alternative, a notification of the predicted distress event may be sent to the relevant first responders at step 416. The notification processing at steps 414, 416 may be performed at the QA system 100 by the notification process 14 or other NLP question answering system. As described herein, notification of the predicted distress event may be broadcast in near-real time and funneled back to the relevant users presently engaging with the cognitive system as well as to relevant first responders along with details about the predicted distress event.

After using a predictive model to classify, predict and broadcast events in near-real time back to the users who engage with the cognitive system, the process ends at step 420, at which point the cognitive system awaits submission of additional questions for processing and response. In addition, the predicted distress event may also be stored in the distress event corpus (e.g., 373) while the related question and answer are stored in the Q&A history repository (e.g., 371) for use in process subsequent questions.

By now, it will be appreciated that there is disclosed herein a system, method, apparatus, and computer program product for predicting an event occurrence based on a question presented to an information handling system having a processor and a memory which extract profile information from a set of users interacting with the information handling system for combination with related event history information and related questions and/or answers from spatially and/or temporally proximate users to classify, score, and rank a candidate set of distress events to identify a predicted event that is sent back to the relevant user(s) and/or broadcast to first responders in near-real time. As disclosed, the system, method, apparatus, and computer program product receive a first question from a first user and also receive one or more additional questions from one or more additional users. In addition, a plurality of context parameters for the first question is generated or identified by the information handling system. In selected embodiments, the context parameters may be generated by performing a natural language processing (NLP) analysis of the first question, wherein the NLP analysis extracts key terms, question sentiment, question focus, and lexical answer type information, from the first question. In addition, one or more profile parameters for the first user are generated or identified by the information handling system. In selected embodiments, the user profile parameter(s) are generated by identifying a first user location and time information and/or by performing authorship profile processing analysis of the first user to identify behavioral characteristics of the first user. In addition, one or more historical questions, answers, and events having a specified spatial and/or temporal proximity to the first question are generated or identified by the information handling system. In selected embodiments, the historical questions having the specified spatial and/or temporal proximity to the first question may be generated by performing a machine learning approach for identifying one or more historical questions from a question database that are similar to the first question. In other embodiments, the historical answers having a specified spatial and/or temporal proximity to the first question are generated by performing a machine learning approach for identifying one or more historical answers from an answer database that are similar to a first answer to the first question. In other embodiments, the historical events are generated by performing a probabilistic or vector space model-based search for identifying one or more distress events from an event database that have a specified spatial and/or temporal proximity to the first question. Based on the plurality of context parameters, the one or more profile parameters for the first user, and the one or more historical questions, answers, and events, the information handling system generates a ranked plurality of event occurrences, and then selects or predicts an event occurrence from the ranked plurality of event occurrences based on rank for inclusion in a notification message. In selected embodiments, the ranked plurality of event occurrences are generated by performing a natural language processing (NLP) to execute a machine learning classification model based on model inputs comprising location information for the first user, user profile attributes for the first user, submission timing information for the first question, question sentiment, question focus, and lexical answer type information for the first question. The disclosed system, method, apparatus, and computer program product may also send, in near-real time to submission of the first question, a notification message to at least the first user which includes the top ranked event occurrence. In addition or in the alternative, the disclosed system, method, apparatus, and computer program product may also send, in near-real time to submission of the first question, a notification message to one or more first responders which includes the top ranked event occurrence. In addition or in the alternative, the disclosed system, method, apparatus, and computer program product may analyze the first question according to action generation criteria to determine if a threshold number of one or more additional end users are asking related questions within a specified time frame and proximity to the first question.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, of predicting an event occurrence based on a question presented to the system, the method comprising:
   receiving, by the system, a first question submitted by a first user;
   generating, by the system, a plurality of context parameters for the first question by transforming one or more extracted inputs relating to submission timing for the first question and location for where the first user submitted the first question to a common format;
   generating, by the system, one or more profile parameters for the first user;
   generating, by the system, one or more historical questions, answers, and events having a specified spatial or temporal proximity to the first question;
   generating, by the system, a ranked plurality of event occurrences based on the plurality of context parameters, the one or more profile parameters for the first user, and the one or more historical questions, answers, and events by performing natural language processing (NLP) and executing a machine learning classification model based on model inputs comprising location information for the first user, profile attributes for the first user, submission timing information for the first question, question sentiment, question focus, and lexical answer type information for the first question;
   predicting an event occurrence by selecting a highest ranked event occurrence from the ranked plurality of event occurrences; and
   sending to two different places a notification message that includes the highest ranked event occurrence, where the notification message is separate from an answer to the first question.

2. The method of claim 1, wherein generating the plurality of context parameters for the first question comprises performing, by the system, a natural language processing (NLP) analysis of the first question, wherein the NLP analysis extracts key terms, question sentiment, question focus, and lexical answer type information, from the first question.

3. The method of claim 1, wherein generating one or more profile parameters for the first user comprises performing, by the system, authorship profile processing analysis of the first user to identify behavioral characteristics of the first user.

4. The method of claim 1, wherein generating one or more profile parameters for the first user comprises identifying, by the system, a first user location and time information for when the first question was submitted.

5. The method of claim 1, wherein generating one or more historical questions having the specified spatial or temporal proximity to the first question comprises performing, by the system, a machine learning approach for identifying one or more historical questions from a question database that are similar to the first question.

6. The method of claim 1, wherein generating one or more historical answers having the specified spatial or temporal proximity to the first question comprises performing, by the system, a machine learning approach for identifying one or more historical answers from an answer database that are similar to a first answer to the first question.

7. The method of claim 1, wherein generating one or more historical events comprises performing, by the system, a probabilistic or vector space model-based search for identifying one or more distress events from an event database that have the specified spatial or temporal proximity to the first question.

8. The method of claim 1, further comprising sending a notification message to at least the first user which includes the highest ranked event occurrence.

9. The method of claim 1, where sending the notification message comprises sending a notification message to one or more first responders which includes the highest ranked event occurrence.

10. The method of claim 1, further comprising analyzing, by the system, the first question according to action generation criteria to determine if a threshold number of one or more additional end users are asking related questions within a specified time frame and proximity to the first question.

11. A method, in an information handling system comprising a processor and a memory, of predicting a distress event, the method comprising:
   receiving, by the system, a first question submitted by a first user;
   generating, by the system, a plurality of context parameters for the first question by transforming one or more extracted inputs relating to submission timing for the first question and location for where the first user submitted the first question to a common format;
   generating, by the system, one or more profile parameters for the first user;
   generating, by the system, one or more historical questions, answers, and events having a specified spatial and/or temporal proximity to the first question;
   generating, by the system, a ranked plurality of event occurrences based on the plurality of context parameters, the one or more profile parameters for the first user, and the one or more historical questions, answers, and events by performing natural language processing (NLP) and executing a machine learning classification model based on model inputs comprising location information for the first user, profile attributes for the first user, submission timing information for the first question, question sentiment, question focus, and lexical answer type information for the first question;
   predicting, by the system, a first distress event by selecting a highest ranked distress event from the ranked plurality of candidate distress events; and
   sending a notification of the first distress event to a plurality of users comprising one or more first responders.

* * * * *